Jan. 5, 1926.  1,568,660
G. A. DUMAS
DEVICE FOR DELIVERING A MEASURED QUANTITY OF ICE CREAM
Filed Dec. 9, 1924   2 Sheets-Sheet 1
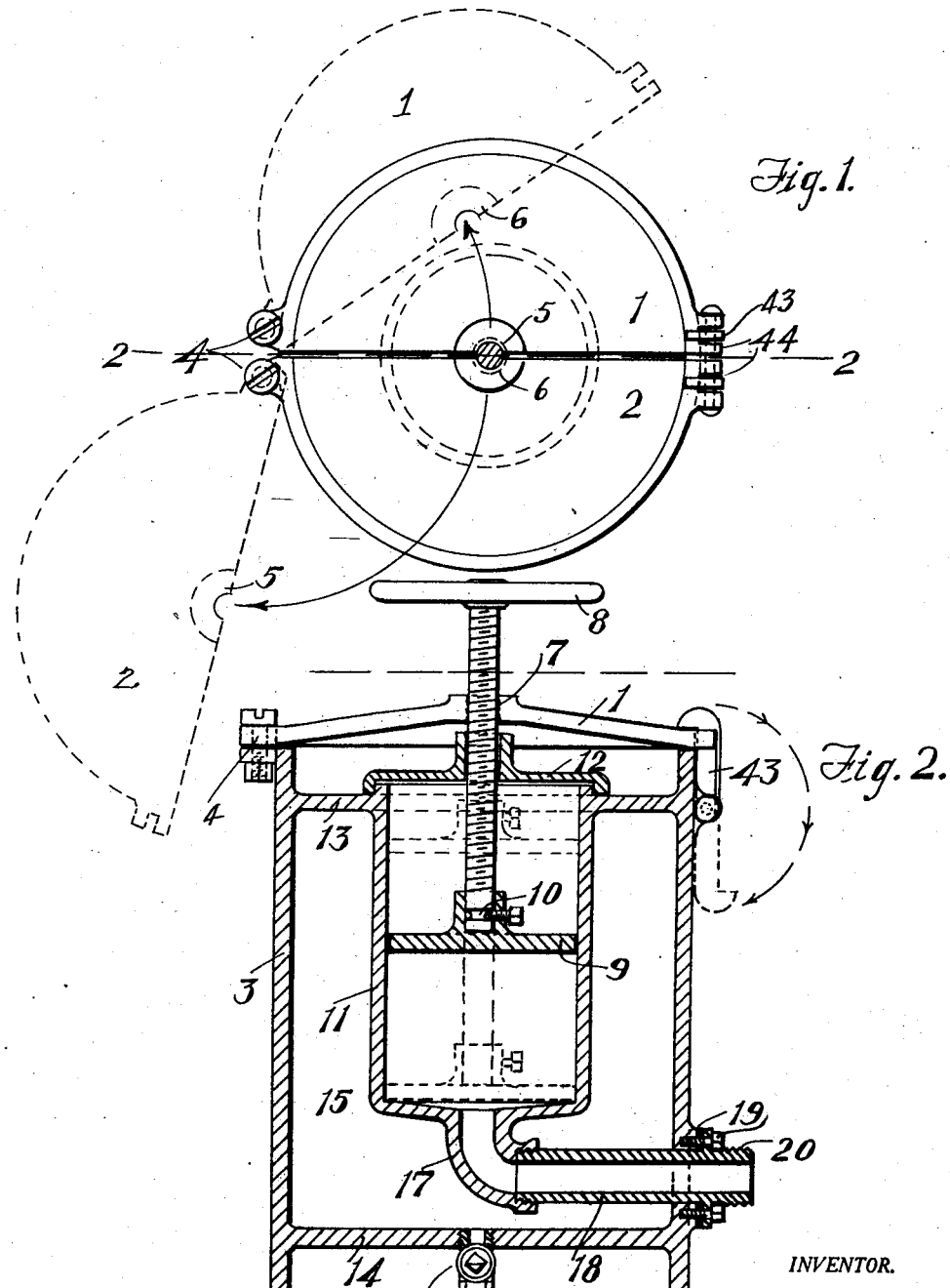
INVENTOR.
BY George A. Dumas.
Harry M. Bown.
ATTORNEY Jan. 5, 1926. 1,568,660
G. A. DUMAS
DEVICE FOR DELIVERING A MEASURED QUANTITY OF ICE CREAM
Filed Dec. 9, 1924 2 Sheets-Sheet 2
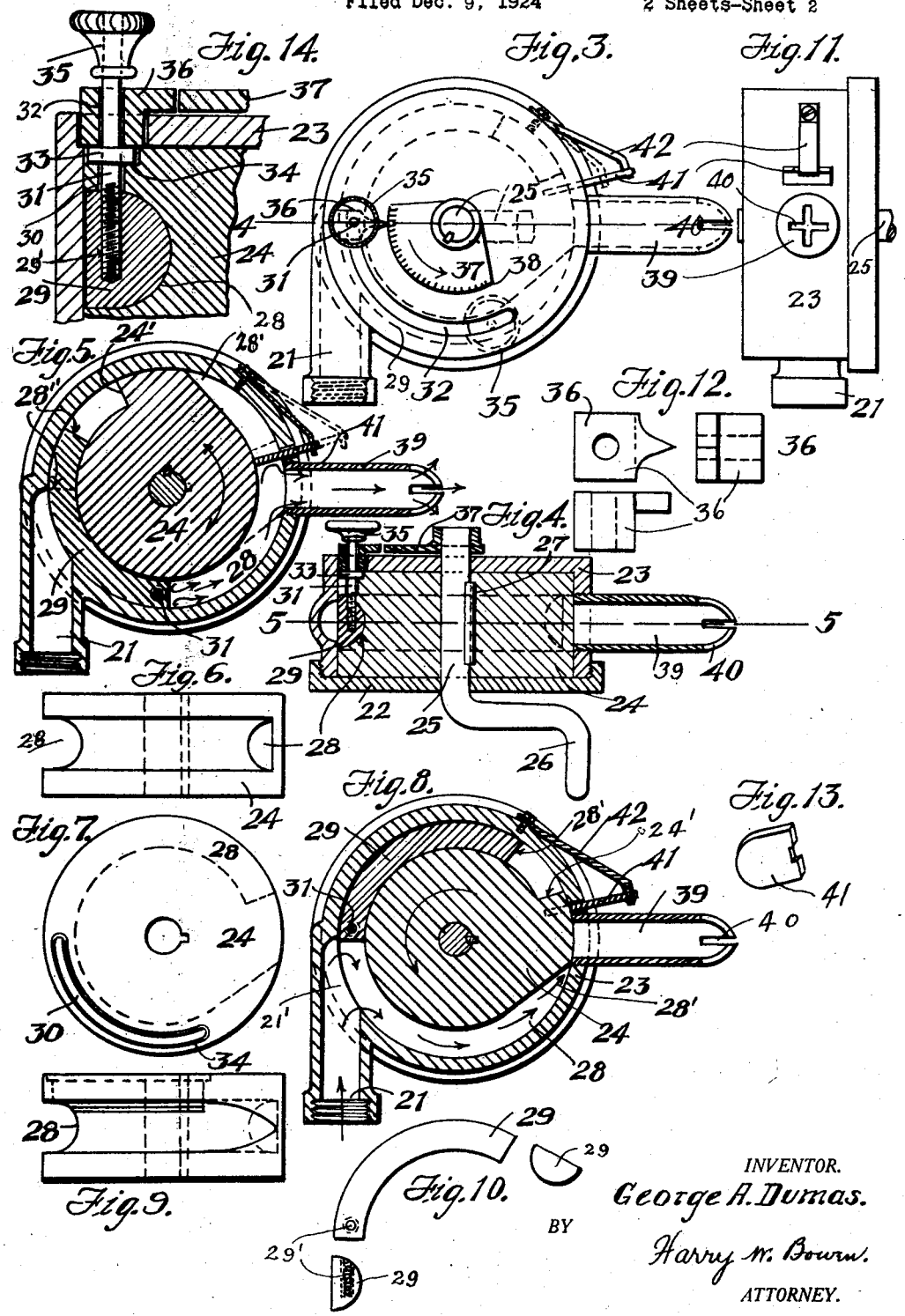
INVENTOR.
George A. Dumas.
BY
Harry W. Bown.
ATTORNEY.

Patented Jan. 5, 1926.

1,568,660

UNITED STATES PATENT OFFICE.

GEORGE A. DUMAS, OF SPRINGFIELD, MASSACHUSETTS, ASSIGNOR OF ONE-HALF TO HERBERT L. HANDY, SR., OF SPRINGFIELD, MASSACHUSETTS.

DEVICE FOR DELIVERING A MEASURED QUANTITY OF ICE CREAM.

Application filed December 9, 1924. Serial No. 754,732.

*To all whom it may concern:*

Be it known that I, GEORGE A. DUMAS, a a citizen of the United States, residing at Springfield, in the county of Hampden and State of Massachusetts, have invented new and useful Improvements in a Device for Delivering a Measured Quantity of Ice Cream, of which the following is a specification.
This invention relates to improvements in a device for delivering a measured quantity of ice cream or like substances.

The invention broadly comprises a receptacle member for receiving the cream to be delivered, a device in the receptacle for forcing the cream from the member and means for controlling or measuring the quantity of cream that is to be delivered. Means are also provided for exhausting the air in an air tight member which surrounds the receptacle in which the cream is contained in order to maintain it in a frozen condition for a long time.

The measuring device of my improvement broadly comprises a rotatable member, a plunger part which is operated by the rotatable member for forcing the cream outward in a definite or measured quantity and means for adjusting the measuring device.
Referring to the drawings:

Fig. 1 is a top plan view of the air tight outer member and in dotted lines the receptacle in which the cream is placed, also showing the separable cover plates for the outer member.

Fig. 2 is a vertical sectional view on the line 2—2 of Fig. 1 showing the receptacle in which the cream is placed, the follower for forcing the cream from the receptacle and the outer air tight casing for maintaining a vacuum about the cream containing receptacle.

Fig. 3 is a plan view of the cream measuring device showing its adjustable feature and the graduations for indicating the adjustment of the device.

Fig. 4 is a vertical sectional view on the line 4—4 of Fig. 3 showing the interior construction of the measuring device.
Fig. 5 is a horizontal sectional view on the line 5—5 of Fig. 4 showing the gate or scraper device for removing any cream that may adhere to the movable member, also the arc shaped plunger, or piston, which expels the cream in a measured quantity.

Fig. 6 is a detail view of the rotatable member.

Fig. 7 is a detail view of one of the cover plates of the measuring device showing the arc shaped slot for adjusting the cream expelling plunger.

Fig. 8 is a detail view similar to Fig. 5 showing the parts in a different position, and before the cream is forced into the measuring device.

Fig. 9 is a side elevational view of the rotatable member showing the semi-circular groove therein.

Fig. 10 is a detail view of the plunger or expelling member and the measuring device.

Fig. 11 is an end elevational view of Fig. 3 looking from the right.

Fig. 12 is a detail view of the pointer or measure indicating device.

Fig. 13 is a detail view of the scraper element for removing any cream that may adhere to the curved groove of the measuring device, and Fig. 14 is an enlarged detail view of the means for adjusting and clamping the cream expelling plunger to the rotatable part of the measuring member.

Referring to the drawings in detail:

1 and 2 designate the two sections of the cover portion which are pivotally connected to the outer air tight casing 3 by means of the pins 4. The meeting edges of these cover sections are formed with threaded portions 5 and 6 which register and cooperate to produce a circular threaded opening to receive the threaded rod 7. Attached to the upper end of this rod is a hand wheel 8 and rotatably attached to the lower end of this rod is a cream expelling plunger 9 by means of the groove and pin connection 10. The follower, or plunger 9 moves up and down in the cream receiving receptacle 11. 12 is a cover which is placed over the upper end of the receptacle 11. The outer casing is formed with a top partition plate 13 and a bottom member 14. The annular space between the casing 3 and the receptacle 11, indicated at 15 is designed to have the air exhausted therefrom in order to produce a vacuum whereby the contents of the receptacle 11 will be prevented from melting. A suitable valve is indicated at 16 for attaching an air pump for exhausing the air from the space 15. Depending from the lower end of the receptacle 11 is a discharge pipe 17 to which is attached the delivery pipe 18 that extends through the wall of the casing 3 and is secured thereto by means of the attaching bolts 19. This pipe is threaded as indicated at 20 for securing the cream measuring member shown in detail in Figs. 3 to 14 inclusive. 21 designates the threaded connection of the measuring device which device comprises the plate 22 and the cup shaped member 23. Located between the plate 22 and member 23 is the rotatable member 24 which is operated by means of the shaft 25 and a crank 26, which shaft is keyed to the member 24 as indicated at 27. The rotatable member 24 has formed in its outer edge thereof a groove 28; the cross sectional formation of which is substantially semi-circular as shown in Figs. 4, 5, 9, and 14. This groove communicates with the discharge end 21' of the threaded pipe 21 as shown in Fig. 8. 29 designates an arc shaped plunger member, the cross section of which corresponds with the formation of the groove 28. The movable member 24 is formed with an arc shaped opening 30 which extends into the groove 28. Located in this opening is a set screw or pin 31, the lower end of which extends through the opening 30 and is threaded and enters a threaded opening 29' in the plunger or discharge member 29 shown in Fig. 4. The cup-shaped member 23 is also formed with arc shaped opening 32 (see Fig. 3) through which the threaded pin 21 projects. This pin is provided with an integral collar or annular portion 33 which rests upon an annular surface 34, adjacent the arc shaped opening 30 of the member 24, see Figs. 4, 7, and 14. The upper end of the pin 31 is provided with an operating knob 35. Located on the pin 31 is a rectangular shaped pointer device 36 which fits into and moves along in the slot 32 when the plunger 29 is adjusted by the pin 31. Attached to the shaft 25 is an index plate 37 which is formed with the graduations 38. The groove 28, it will be noticed, is tapered at its discharge end portion as indicated at 28'. A delivery tube 39 is attached to the casing member 23. This tube is formed with slits 40 in its end, whereby when the ice cream is discharged it will have a decorated appearance.

For the purpose of removing any cream which might adhere to the sides of the groove 28 a scraper plate 41 is provided which is projected inward through the casing 23 into the groove 28 by means of the spring 42 which forces it inward.

For the purpose of accurately measuring the quantity of ice cream to be discharged the plunger 29 is moved in the groove 28 by means of the pin 31 after it is loosened. The operator moves the pin in the groove 32 to the required graduation mark 38 on the plate 37. The pointer 36 is carried along in the slot 32 with the pin 31 at the same time to the desired position. When the correct position is obtained the operator threads the pin into the plunger 29 and at the same time clamps or rigidly connects the plunger 29 to the movable member 24 by means of the integral flange member 33 of the pin 31 which flange engages the annular surfaces 34 of the movable member 24, see Fig. 14. Therefore, when the shaft 25 is operated the member 24 will move the plunger 29 against the cream that is contained in the groove 28 forcing it outward through the delivery tube 39 as indicated by the arrows in Fig. 8. It should be stated however that when the plunger 9 in Fig. 2 is forced downward the cream is driven through the tubes at 17 and 18 into the pipe connection 21 and from there into the grooved annular passage way 28. The parts are then in their position as shown in Fig. 8. Next, the parts are in the position as shown in Fig. 5 with the scraper plate 41 engaging the groove 28. This plate also operates as a gate to direct the cream into the delivery tube 39, as shown in Fig. 5.

From this description it will be seen that I have provided a receptacle for containing ice cream or the like and with means for forcing the same out of the receptacle into a device for accurately measuring the quantity to be delivered to a purchaser.

Referring again to Fig. 2 the cover sections 1 and 2 are retained in place by means of the pivotal latches 43 which enter the openings 44 in their edges whereby they are retained in place against lateral movement.

What I claim is:

1. A measuring device comprising a rotatable member which is formed with a groove in its edge to receive the material, means for rotating the grooved member, adjustable piston means in the groove for varying the volume of the groove portion into which the material is forced, and means for permitting the escape of the material from the grooved portion.

2. A measuring device for the purpose described, comprising a rotatable disk-shaped member which is formed with a groove in its edge, a casing surrounding the rotatable member, an arc shaped member movably fitted in the groove, means for rotating the member, means for securing the movable member to the rotatable member in different positions in the groove to determine the quantity to be measured.

3. A measuring device for ice cream or the like, comprising a rotatable member which is formed with an annular grooved part in its edge, a casing for enclosing the said member, a delivery tube cooperating with the groove, an arc shaped plunger member movably fitted in the groove, means for rotating the member, means for securing the plunger to the member in different positions in the groove to determine the quantity to be measured, said means comprising a casing having an arc shaped opening therein, a pin passing through the opening, the rotatable member having an arc shaped opening to receive the pin, which pin is attached to the plunger, and means when the pin is threaded into the plunger which connects the plunger and the rotatable member together so that they may move as a unit.

4. A measuring device for ice cream or the like, comprising a rotatable member which is formed with an annular grooved part in its edge, a casing for enclosing the said member, a delivery tube cooperating with the groove, an arc shaped plunger member movably fitted in the groove, means for rotating the member, means for securing the plunger to the member in different positions in the groove to determine the quantity to be measured, said means comprising a casing having an arc shaped opening therein, a pin passing through the opening, the rotatable member having an arc shaped opening to receive the pin, which pin is attached to the plunger and means when the pin is threaded into the plunger which connects the plunger and the rotatable member together so that they may move as a unit, and a gate device for preventing the material as it leaves the groove from passing beyond the entrance end of the delivery tube.

5. A measuring device comprising in combination, a casing, a delivery tube, a rotatable disk shaped member in the casing which is formed with a groove in its edge, a supply tube which terminates adjacent the grooved part, an adjustable device fixed in the groove of less extent than the groove for expelling the material through the tube and a gate device for cooperating with the groove for directing the material through the tube and for scraping the groove as described.

6. A device for delivering a measured quantity of semi-solid material under pressure comprising a disk-shaped rotatable member formed with a groove therein, means for rotating the member, and adjustable means in the groove for varying the delivered quantity.

GEORGE A. DUMAS.